United States Patent
Kato

[11] Patent Number: 6,128,005
[45] Date of Patent: Oct. 3, 2000

[54] MOUSE OPERABLE IN NARROW SPACE WITHOUT LIFTING

[75] Inventor: Isamu Kato, Omiya, Japan

[73] Assignee: Edikun Giken Co. Ltd., Omiya, Japan

[21] Appl. No.: 09/022,633

[22] Filed: Feb. 12, 1998

[30] Foreign Application Priority Data

Feb. 13, 1997 [JP] Japan .................................... 9-042856

[51] Int. Cl.[7] ........................................................ G09G 5/08
[52] U.S. Cl. ............................................................ 345/163
[58] Field of Search ............................ 345/163, 157, 345/158, 166

[56] References Cited

U.S. PATENT DOCUMENTS 5,164,713  11/1992  Bain .................................... 345/157
5,877,748  3/1999  Redlich .............................. 345/163

*Primary Examiner*—Richard A. Hjerpe
*Assistant Examiner*—Kevin M. Nguyen
*Attorney, Agent, or Firm*—Pillsbury Madison & Sutro LLP

[57] ABSTRACT

A mouse operable in a narrow space on a desk or the like without interposing an operation of lifting the mouse off a mouse pad, moving it in the air and putting it down on the mouse pad. The mouse comprises a moving amount sensor for detecting moving amounts of the mouse in a first area set on a mouse pad, and a second area outside the first area, a button arranged on the mouse, an area sensor for detecting whether the mouse is located in the first or second area, and a signal generator for, when the mouse is located in the first area, generating a signal that moves the pointer by a distance corresponding to a moving amount of the mouse and, when the mouse is located in the second area, generating a signal that moves the pointer at a predetermined speed.

14 Claims, 16 Drawing Sheets

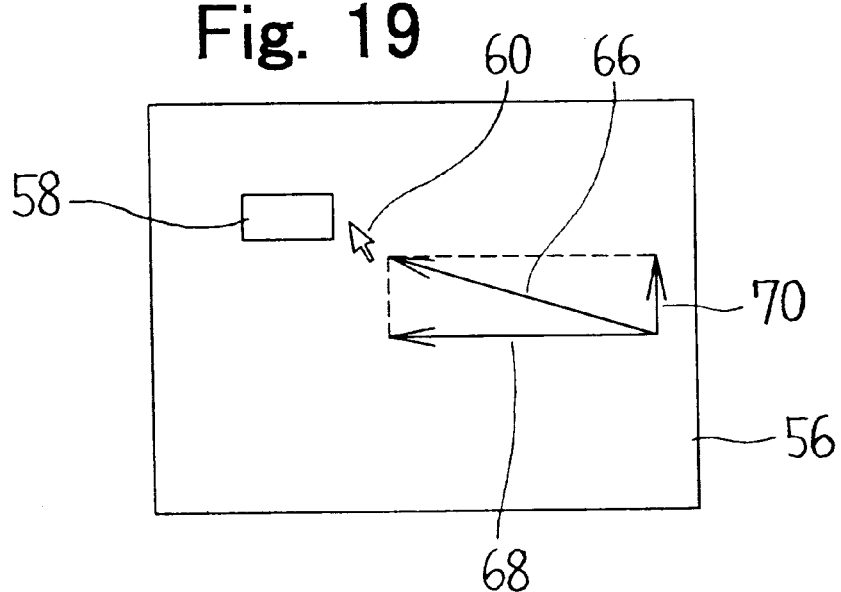
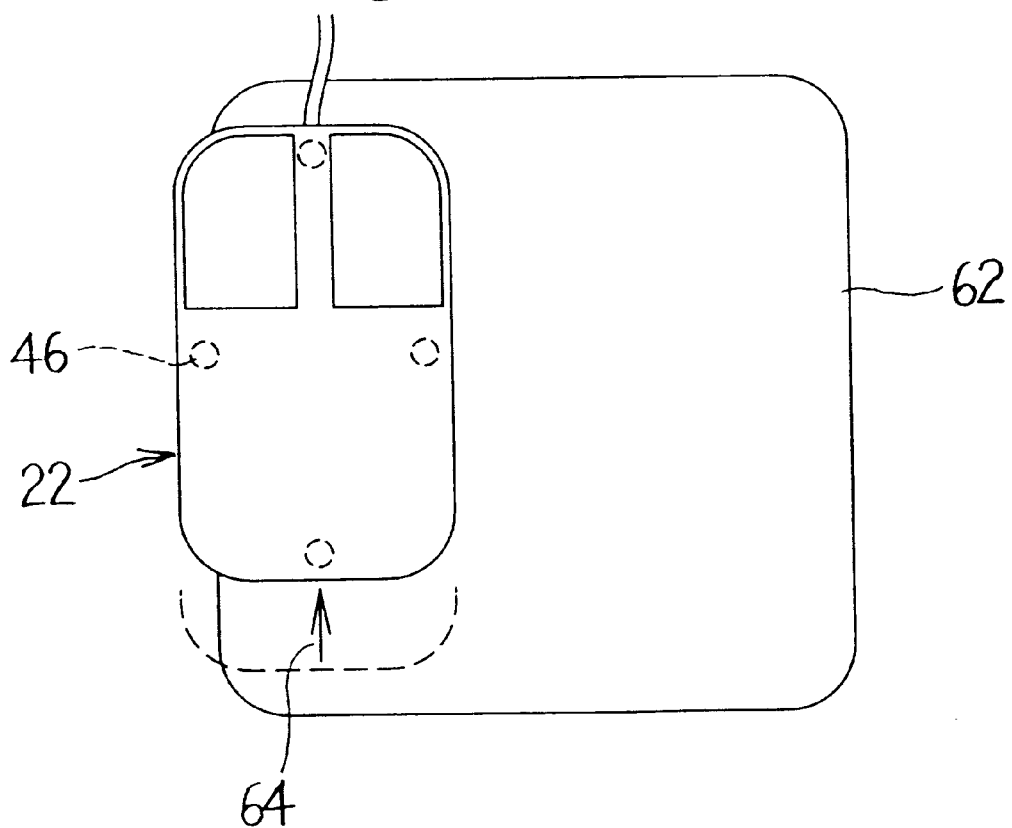

MOUSE OPERABLE IN NARROW SPACE WITHOUT LIFTING

BACKGROUND OF THE INVENTION

1. Field of the Invention

The present invention relates to a mouse, which can operate a pointer displayed on the display of a computer, in a narrow space on a desk or the like without interposing an operation of lifting the mouse off a mouse pad, moving it in the air and putting it down on the mouse pad.

2. Related Background Art

A mouse is often employed to move a pointer displayed on the display of a computer.

A conventional method of using a mouse will be described with reference to FIGS. 1 to 3. FIG. 1 shows an image displayed on the display. A pointer 2 and buttons 4 and 6 are displayed on the display. Assume that the button 4 is clicked, i.e., that the pointer 2 is to be moved onto the button 4 and the left button of the mouse is to be depressed. For this purpose, a conventional mouse 10 must be moved to the left on a mouse pad 12, as indicated by an arrow 8 in FIG. 2. Assume that, when the mouse 10 is moved in such a manner, the mouse 10 reaches the edge of the mouse pad 12 but the pointer 2 does not reach the button 4.

In this case, the mouse 10 is moved as indicated by an arrow 14 in FIG. 3. FIG. 3 shows the mouse 10 and mouse pad 12 seen from behind. Low-friction members 16 and 18 which allow the mouse 10 to move smoothly on the mouse pad 12 are attached to the bottom surface of the mouse 10, and a ball 20 for transmitting the moving amount of the mouse 10 to encoders (not shown) arranged in the mouse 10 projects from the bottom surface of the mouse 10. As indicated by the arrow 14, first, the mouse 10 is lifted, is moved to the right in the air, is put down on the mouse pad 12, and is moved to the left on the mouse pad 12. When the mouse 10 is moved to the right, since the mouse 10 is in the air and the ball 20 is separate from the mouse pad 12, the pointer 2 on the display is kept stopped. When the mouse 10 is put down on the mouse pad 12 and moved to the left, the pointer 2 is moved to the left.

SUMMARY OF THE INVENTION

It is an object of the present invention to provide a mouse which can be operated in a narrow space on a desk or the like without interposing an operation of lifting the mouse off a mouse pad, moving it in the air, and putting it down on the mouse pad.

In order to achieve the above object, according to the present invention, there is provided a mouse used for operating a pointer displayed on a display of a computer to give a control signal to the computer, comprising a moving amount sensor for detecting moving amounts of the mouse in a first area set on a mouse pad, a desk, or the like, and a second area outside the first area, a button arranged on an upper surface of the mouse, an area sensor for detecting whether the mouse is located in the first or second area, and a signal generator for, when the area sensor detects that the mouse is located in the first area, generating a signal that moves the pointer on the display by a distance corresponding to a moving amount detected by the moving amount sensor and, when the area sensor detects that the mouse is located in the second area, generating a signal that moves the pointer on the display at a predetermined speed, the generated signal being transmitted to the computer.

When the mouse moves out of the first area to reach the second area, the area sensor preferably detects whether the mouse moves in a forward, backward, right or left direction, and the signal generator preferably generates a signal that moves the pointer upward on the display when the mouse moves out to reach the second area forward, moves the pointer downward on the display when the mouse moves out to the second area backward, moves the pointer to the right on the display when the mouse moves out to the right to reach the second area, and moves the pointer to the left on the display when the mouse moves out to the left to reach the second area.

The area sensor preferably comprises a sensor for detecting that the mouse moves out forward, a sensor for detecting that the mouse moves out backward, a sensor for detecting that the mouse moves out to the right, and a sensor for detecting that the mouse moves out to the left.

When the button is depressed or released, the signal generator preferably generates a signal indicating depression or release, and the generated signal is transmitted to the computer.

The area sensor preferably detects whether the mouse is located in the first or second area by detecting an edge of a mouse pad on which the mouse is operated.

The area sensor preferably comprises a switch having a mechanical contact.

The switch preferably comprises a pipe attached to a body of the mouse, a rod which slides in the pipe when one end thereof comes into contact with or separates from the mouse pad, a first contact attached to the pipe, and a second contact attached to the rod to come into contact with and separate from the first contact.

The first and second contacts preferably separate from each other when the rod is located on the mouse pad.

The first and second contacts can come into contact with each other when the rod is located on the mouse pad.

The switch preferably further comprises a third contact attached to the pipe and a fourth contact attached to the rod to come into contact with and separate from the third contact, and the second and fourth contacts are electrically connected to each other.

The area sensor can comprise an optical sensor.

The area sensor preferably comprises a plurality of optical sensors, and it is preferably detected whether the mouse is located in the first or second area by detecting that an output signal from one of the optical sensors is different from an output signal from remaining one of the optical sensors.

The signal generator preferably generates a signal for moving the pointer gradually faster when the area sensor detects that the mouse is located in the second area.

In order to achieve the object of the present invention, according to the present invention, there is also provided a method of operating a pointer displayed on a display of a computer with a mouse, comprising the first step of detecting moving amounts of the mouse in a first area set on a mouse pad, a desk, or the like, and a second area outside the first area, the second step of detecting whether a button arranged on an upper surface of the mouse is depressed or released, the third step of detecting whether the mouse is located in the first or second area, the fourth step of, when it is detected that the mouse is located in the first area, moving the pointer on the display by a distance corresponding to a moving amount detected in the first step, and the fifth step of, when it is detected that the mouse is located in the second area, moving the pointer on the display at a predetermined speed.

When the first to fourth steps are repeated at a predetermined time interval and the moving amount detected in the first step increases from one interval to another, a rate of increase of the moving amount of the pointer from one interval to another in the fourth step is preferably higher than a rate of increase of the moving amount of the mouse from one interval to another in the first step, and the pointer moves acceleratedly.

When the first to third steps, and the fifth step are repeated, the moving speed of the pointer in the fifth step preferably increases gradually.

In order to achieve the object of the present invention, according to the present invention, there is also provided a computer system comprising a display and a mouse used for operating a pointer displayed on the display, wherein the mouse comprises a moving amount sensor for detecting moving amounts of the mouse in a first area set on a mouse pad, a desk, or the like, and a second area outside the first area, a button arranged on an upper surface of the mouse, an area sensor for detecting whether the mouse is located in the first or second area, and a signal generator for, when the area sensor detects that the mouse is located in the first area, generating a signal that moves the pointer on the display by a distance corresponding to a moving amount detected by the moving amount sensor and, when the area sensor detects that the mouse is located in the second area, generating a signal that moves the pointer on the display at a predetermined speed, the generated signal being transmitted to the computer.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIGS. 7 to 9 are views for explaining a method of positioning a pointer onto the button on the display by using the mouse according to the embodiment of the present invention, in which FIG. 7 shows an image on the display, FIG. 8 shows the mouse seen from above, and FIG. 9 shows the mouse seen from behind;

FIGS. 19 and 20 are views showing another example of moving the mouse according to the embodiment of the present invention, in which FIG. 19 shows an image on the display, and FIG. 20 shows the mouse seen from above;

FIG. 25 is a view for explaining Modification 6 concerning the area sensor used in the mouse of the embodiment of the present invention and shows an area defined on a desk or the like;

DESCRIPTION OF THE PREFERRED EMBODIMENT

Figure 1:
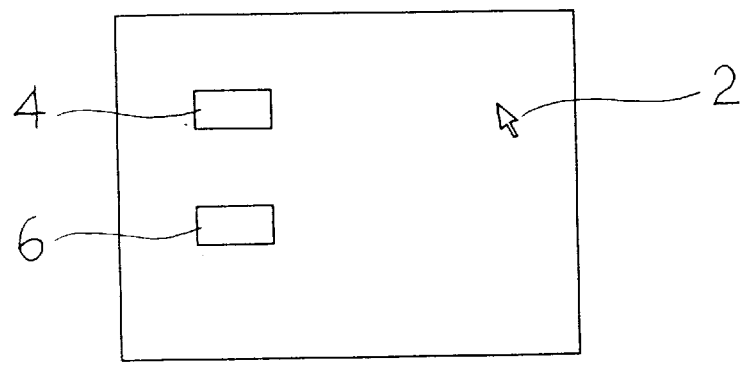
FIG. 1 is a view showing an image on a display in order to explain the function of a conventional mouse.

The preferred embodiment of the present invention will be described in detail with reference to the accompanying drawings. In the drawings, same or corresponding portions are denoted by same numerals.

A computer such as a personal computer generally employs GUI (Graphical User Interface). To move a pointer, e.g., an arrow, a cursor, or an icon, displayed on a display, e.g., a CRT or a liquid crystal display device, that serves as the output device of the computer, a mouse as a typical pointing device is often used. In the following description, note that the pointer operated by the mouse is an arrow.

Figure 2:
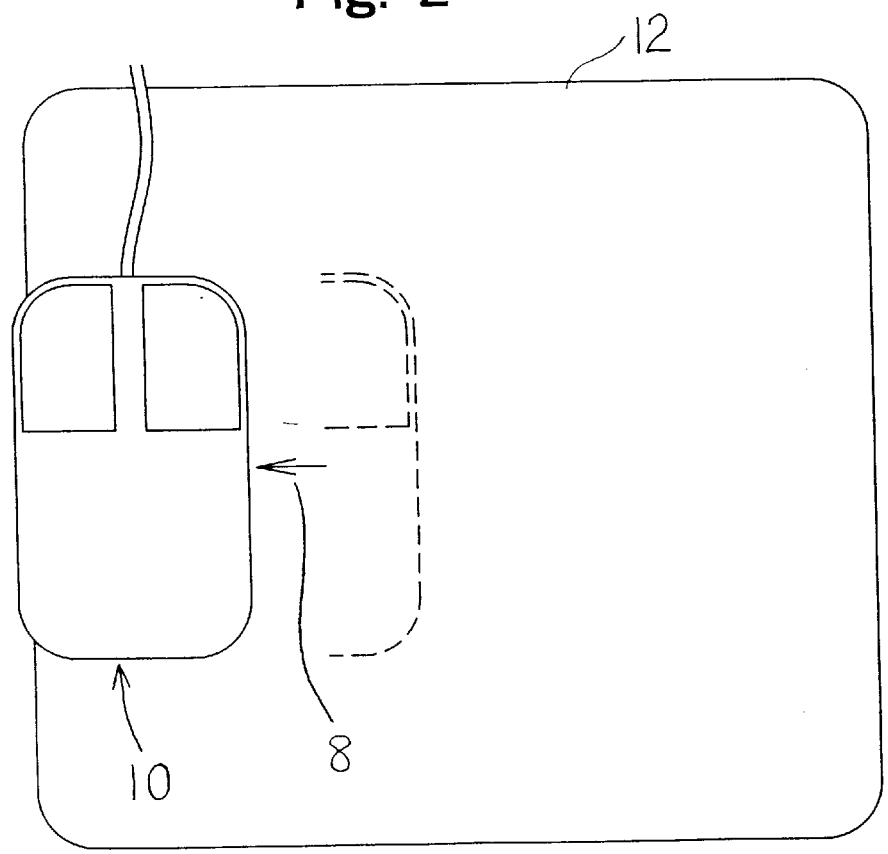
FIG. 2 is a view showing a state wherein the conventional mouse is moved.
Figure 3:
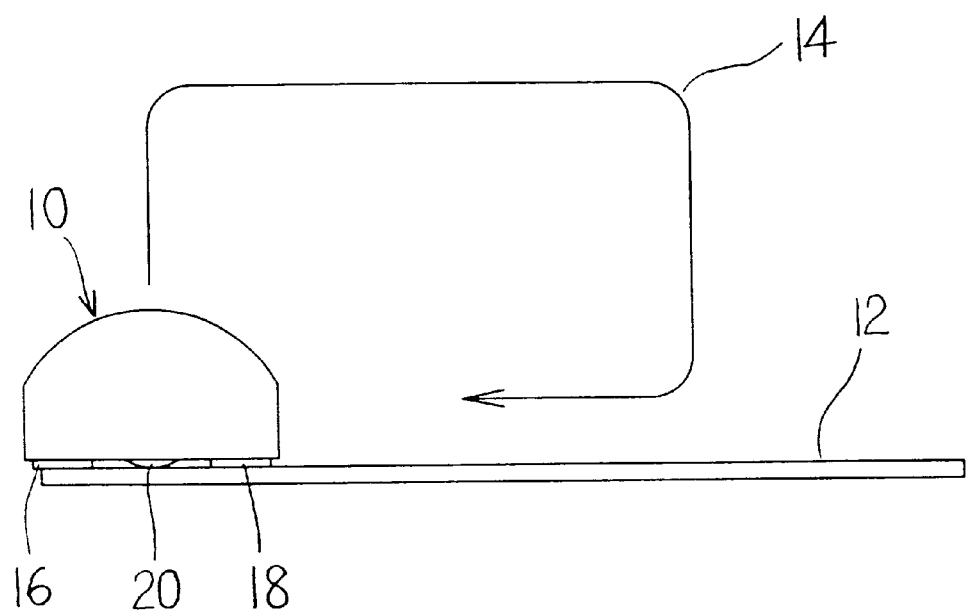
FIG. 3 is a view showing an operation of lifting and moving the mouse in the air, which is required for the conventional mouse.

As described above with reference to FIGS. 1 to 3, when the pointer 2 on the display is to be moved comparatively largely by using the conventional mouse 10, an operation of lifting the mouse 10, moving the mouse 10 in the air in a direction opposite to a direction in which the pointer 2 is to be moved, and putting down the mouse 10 on the mouse pad 12, must be performed. Accordingly, it takes time to move the pointer 2, and an uncomfortable operation is forced, so that a smooth operation feeling cannot be obtained.

To minimize the operation of lifting the mouse 10, moving it in the air and putting it down on the mouse pad 12, the size of the mouse pad 12 must be increased as much as possible. When using the conventional mouse 10, a large space on a desk or the like is required. A space for placing manuals or materials which are to be worked with the computer and a space to be reserved for another work are thus limited.

Embodiment

Figure 4:
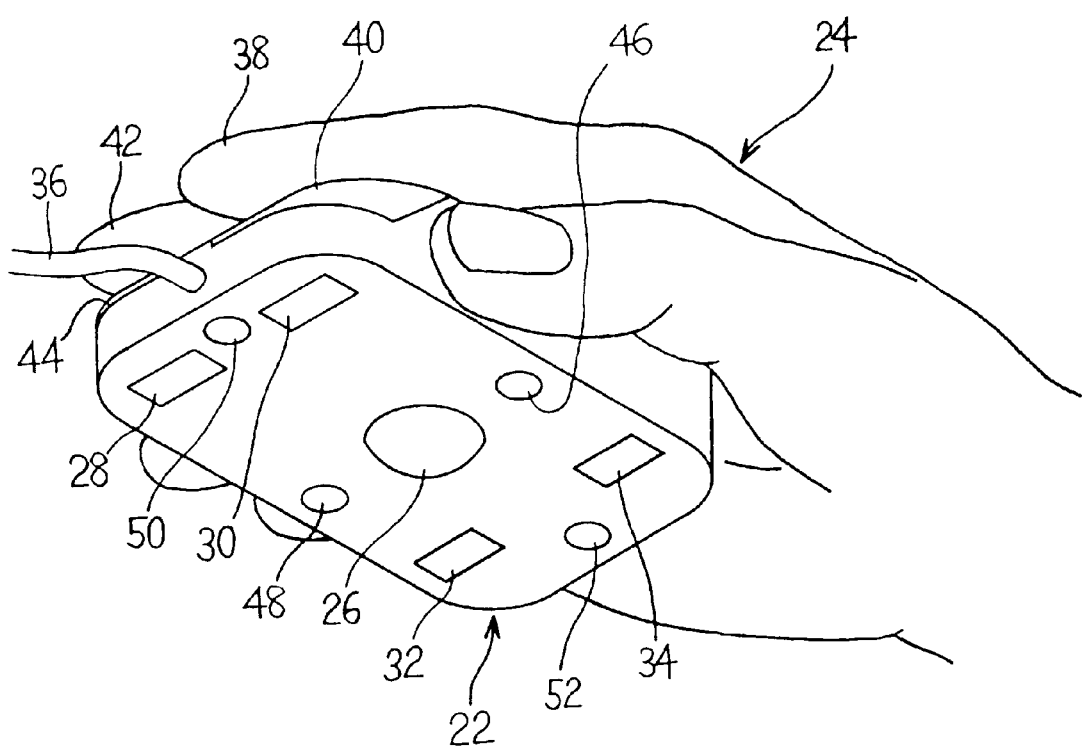
FIG. 4 is a perspective view of a mouse seen from obliquely below according to an embodiment of the present invention.

FIG. 4 is a perspective view of a mouse seen from obliquely below according to an embodiment of the present invention. A mouse 22 incorporates an X-axis encoder (not shown) and a Y-axis encoder (not shown) for detecting the moving amount in the right-to-left direction and in the back-and-forth direction when the mouse 22 is moved with a hand 24. A ball 26 for transmitting the moving amount of the mouse 22 to these encoders projects from the bottom surface of the mouse 22. The X-axis encoder, the Y-axis encoder, and the ball 26 constitute a moving amount sensor. Low-friction members 28, 30, 32, and 34 which allow the mouse 22 to move smoothly on, e.g., a mouse pad, a desk, or a table are arranged on the bottom surface of the mouse 22.

A cord 36 for transmitting signals from the mouse 22 to a computer (not shown) extends from the front portion of the mouse 22. An index finger 38 of the hand 24 is placed on a left button 40, and a middle finger 42 is placed on a right button 44. When the buttons 40 and 44 are depressed or released, the contacts of switches (not shown) incorporated in the mouse are opened/closed, and signals used to indicate clicking, double clicking, dragging, or the like are transmitted from these switches to the computer. Although two buttons 40 and 44 are arranged in FIG. 4, the number of buttons can be one or three or more.

Sensors 46, 48, 50, and 52 for detecting the edge of the mouse pad placed under the mouse 22 are arranged on in the bottom surface of the mouse 22. The sensors 46, 48, 50, and 52 detect the height difference between the upper surface of the mouse pad and the upper surface of the desk or the like, thereby detecting the edge of the mouse pad. The sensors 46, 48, 50, and 52 constitute an area sensor.

Figure 5:
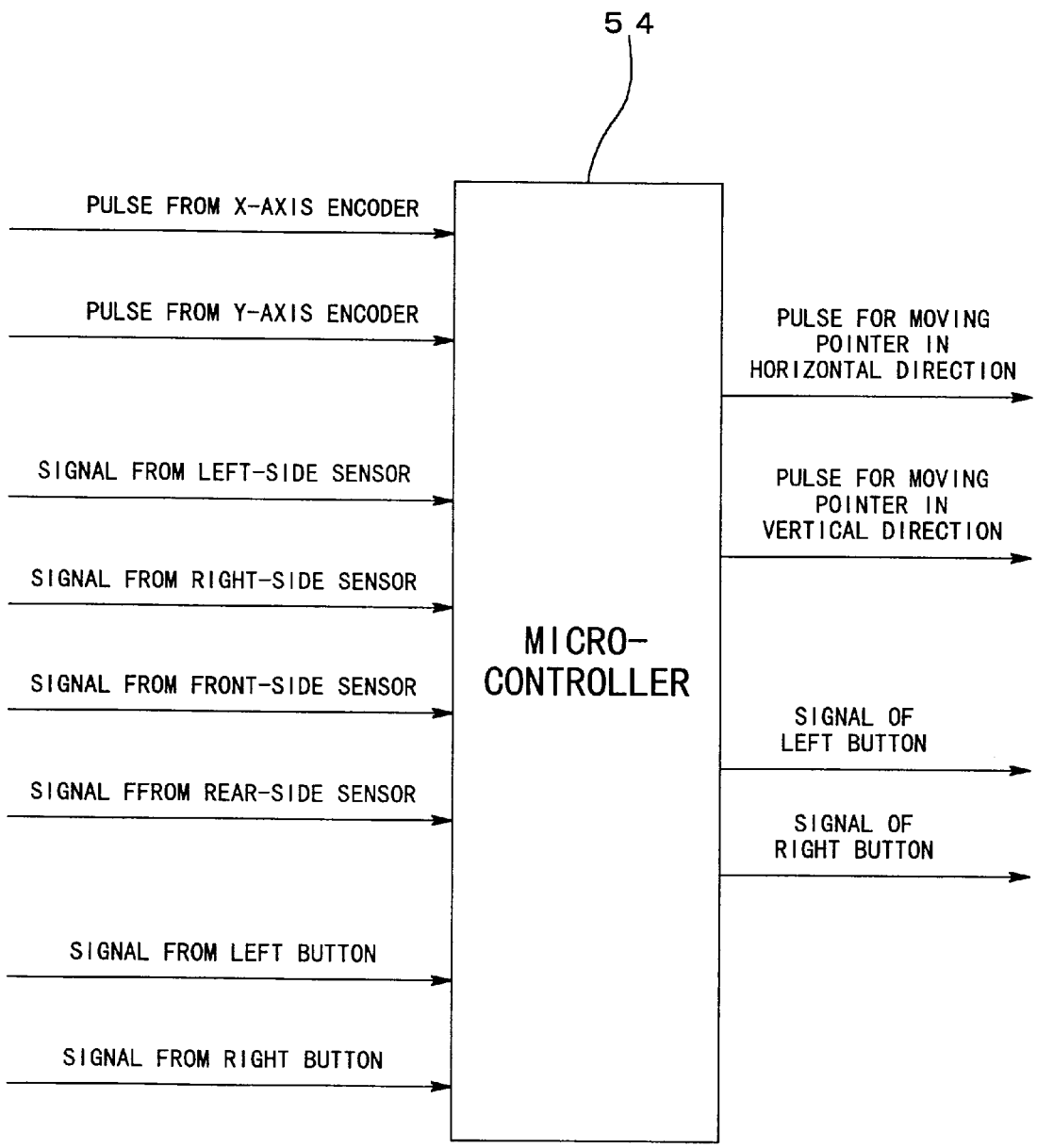
FIG. 5 is a diagram showing the circuit configuration of the mouse according to the embodiment of the present invention.

FIG. 5 shows the circuit configuration of the mouse according to the embodiment of the present invention. This circuit is basically constituted by only one microcontroller 54. The microcontroller 54 incorporates a ROM, and programs are written in the ROM. Pulses from the X- and Y-axis encoders, signals from the sensors 46, 48, 50, and 52, and signals from the left and right buttons 40 and 44 are input to the microcontroller 54. The microcontroller 54 outputs pulses for moving the pointer on the display in the horizontal and vertical directions, and signals of the left and right buttons 40 and 44. The signals output from the microcontroller 54 may be transmitted to the computer after they are processed into one serial data. The microcontroller 54 constitutes a signal generator. The signal generator may be constituted by a plurality of chips.

Figure 6:
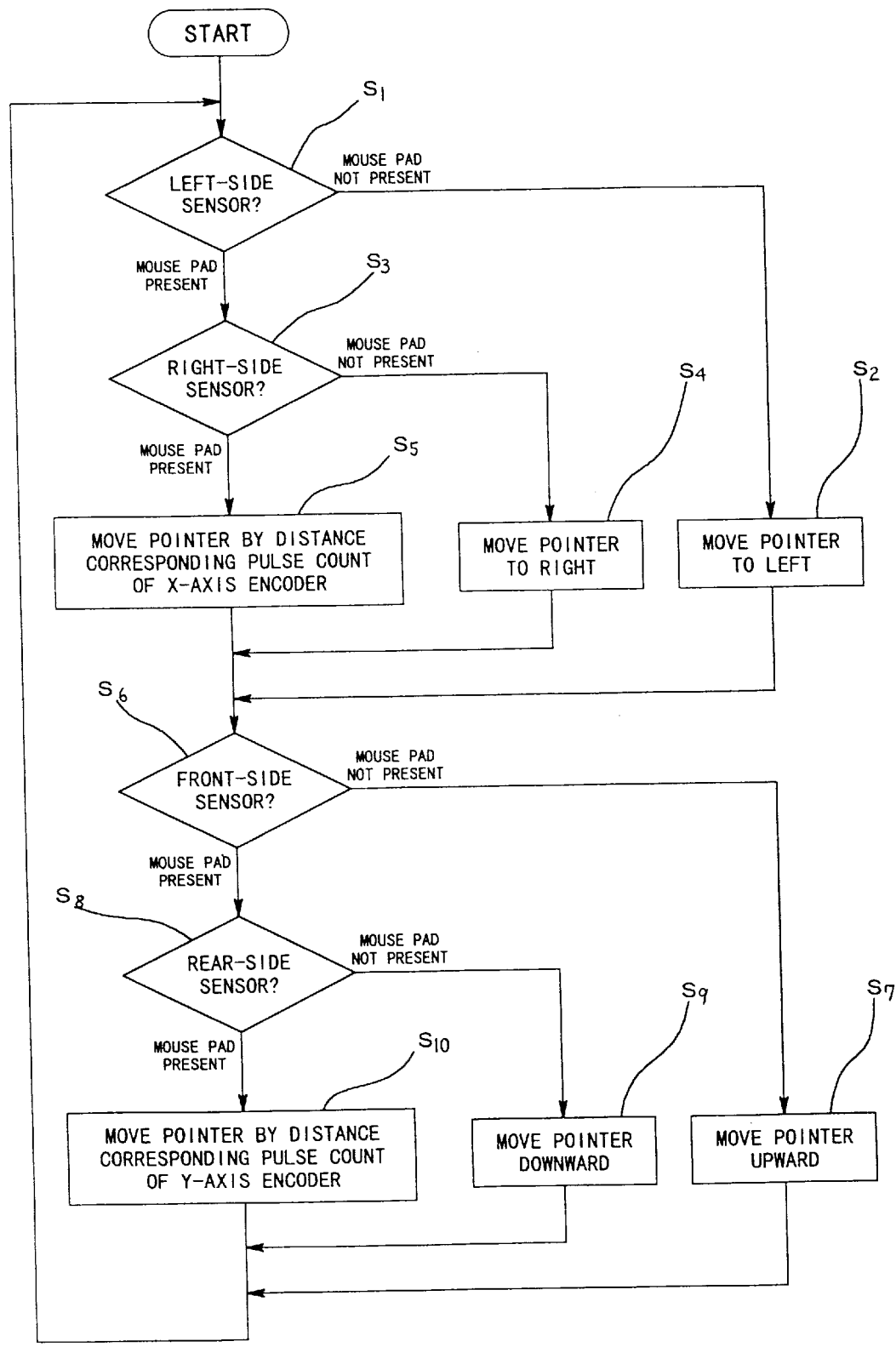
FIG. 6 is a flow chart showing a program which is performed with a microcontroller in the mouse according to the embodiment of the present invention.

FIG. 6 is a flow chart of the program which is incorporated in the ROM of the microcontroller 54 and performed by the microcontroller 54.

It is determined whether the mouse pad is present under the sensor 46, based on the signal from the sensor 46 arranged on the left-side portion of the bottom surface of the mouse 22 (step $S_1$). If NO in step $S_1$, it is determined that the mouse 22 is located partly outside the mouse pad with its left portion, and the microcontroller 54 outputs a signal to move the pointer to the left on the display (step $S_2$). At this time, the pointer moves to the left on the display.

In step $S_1$, if YES, it is determined whether the mouse pad is present under the sensor 48 arranged on the right-side portion of the bottom surface of the mouse 22 (step $S_3$). If NO in step $S_3$, it is determined that the mouse 22 is located partly outside the mouse pad with its right portion, and the microcontroller 54 outputs a signal to move the pointer to the right on the display (step $S_4$). At this time, the pointer moves to the right on the display.

If YES in step $S_3$, the mouse 22 is not partly outside the mouse pad in the right-to-left direction, and accordingly the microcontroller 54 moves the pointer to the right or left on the display by a distance corresponding to the pulse count of the X-axis encoder (step $S_5$).

When the program of FIG. 6 is repeated at a predetermined time interval and the moving amount of the mouse 22 increases from one interval to another, i.e., when the moving speed of the mouse 22 increases gradually, the rate of increase of the moving speed of the pointer from one interval to another may be set to be higher than the rate of increase of the moving speed of the mouse 22 from one interval to another. At this time, the pointer moves acceleratedly. In other words, the moving amount of the pointer may be set such that the higher the pulse frequency of the X-axis encoder, the larger the moving amount of the pointer for the same pulse count of the X-encoder.

Next, it is determined whether the mouse pad is present under the sensor 50, based on the signal from the sensor 50 arranged on the front-side portion of the bottom surface of the mouse 22 (step $S_6$). If NO in step $S_6$, it is determined that the mouse 22 is located partly outside the mouse pad with its front portion, and the microcontroller 54 outputs a signal to move the pointer upward on the display (step $S_7$). At this time, the pointer moves upward on the display.

In step $S_6$, if YES, it is determined whether the mouse pad is present under the sensor 52 arranged on the rear-side portion of the bottom surface of the mouse 22 (step $_8$). If NO in step $S_8$, it is determined that the mouse 22 is located partly outside the mouse pad with its rear portion, and the microcontroller 54 outputs a signal to move the pointer downward on the display (step $S_9$). At this time, the pointer moves downward on the display.

If YES in step $S_8$, the mouse 22 is not partly outside the mouse pad in the back-and-forth direction, and accordingly the microcontroller 54 moves the pointer upward or downward on the display by a distance corresponding to the pulse count of the Y-axis encoder (step $S_{10}$). The moving amount of the pointer may be set such that the higher the pulse frequency of the Y-axis encoder, the larger the moving amount of the pointer for the same pulse count of the Y-encoder.

In the flow chart of FIG. 6, determination of the sensors 46, 48, 50, and 52 is performed in the order of 46, 48, 50, and 52. However, determination of the sensors 46, 48, 50, and 52 may be performed in any order.

Figure 7:
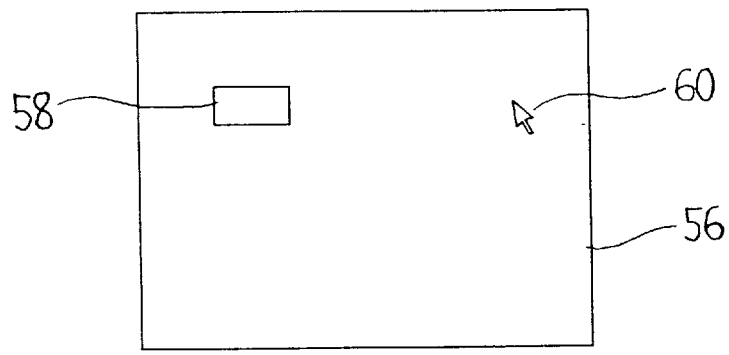
Figure 8:
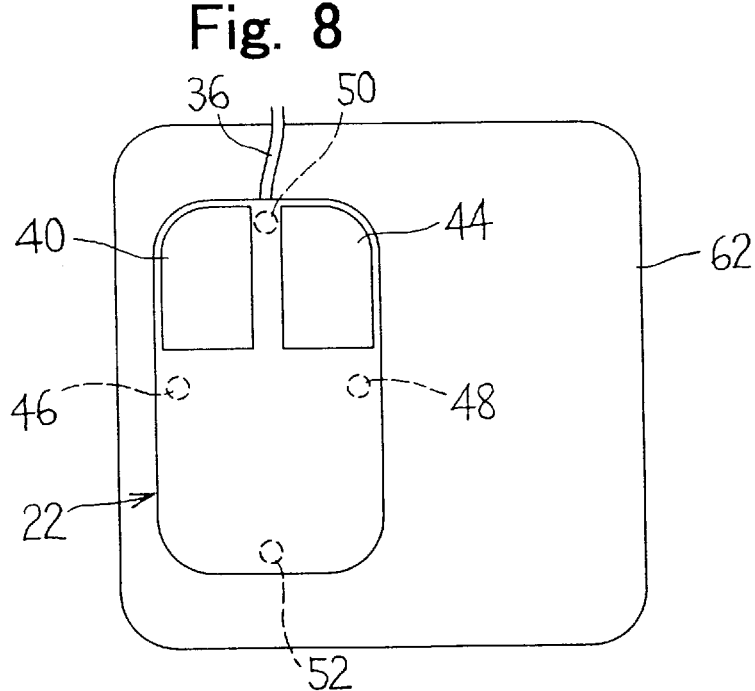
Figure 9:
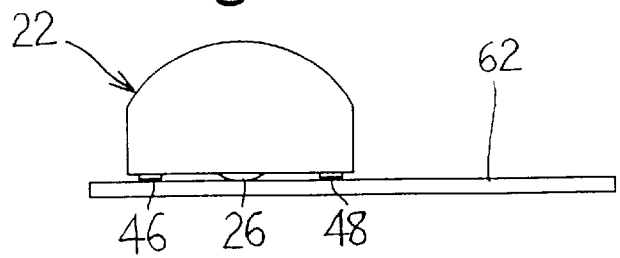

A method of positioning the pointer onto the button on the display by using the mouse according to the embodiment of the present invention will be described. First, assume that a pointer 60 is displayed on the right side of a button 58 on a display 56, as shown in FIG. 7. Also assume that the mouse 22 is located at a position on a mouse pad 62 closer to the left edge, as shown in FIG. 8. FIG. 9 shows the mouse 22 seen from behind. In the state of FIGS. 8 and 9, all of the sensors 46, 48, 50, and 52 detect the presence of the mouse pad 62, which state corresponds to the state of steps $S_5$ and $S_{10}$ in the flow chart of FIG. 6, and the pointer 60 moves by a distance corresponding to the moving amount of the mouse 22 detected by the ball 26.

In FIG. 9, the low-friction members 28, 30, 32, and 34 are not illustrated. The same applies to a view of the mouse seen from behind, which will be referred to in the following description.

Figure 10:
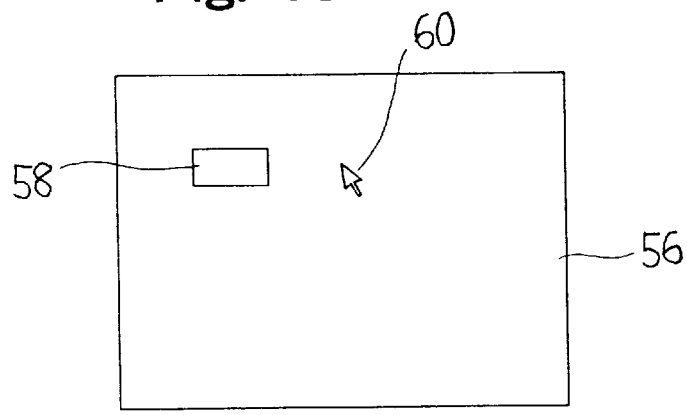
FIGS. 10 to 12 are views for explaining a method of positioning a pointer onto the button on the display by using the mouse according to the embodiment of the present invention, and show a state following the state of FIGS. 7 to 9.
Figure 11:
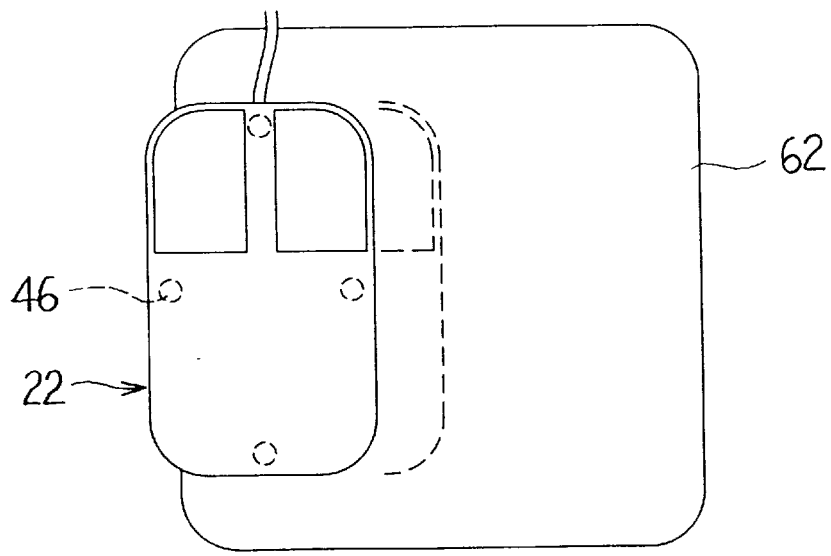
Figure 12:
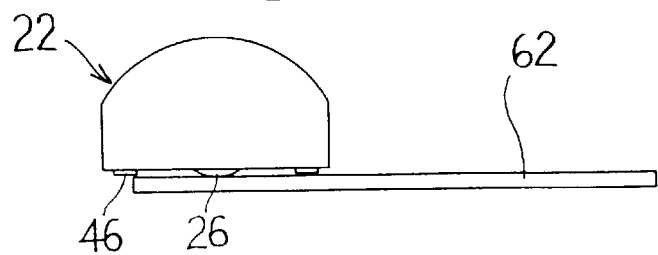

From the state shown in FIG. 8, the mouse 22 is moved to the left to achieve the state shown in FIG. 11. Assume that this movement of the mouse 22 moves the pointer 60 to the left on the display 56 but the pointer 60 does not reach the button 58, as shown in FIG. 10. At this time, the mouse 22 is located partly outside the mouse pad 62, and the mouse pad 62 is not present under the sensor 46, as shown in FIG. 12.

Figure 13:
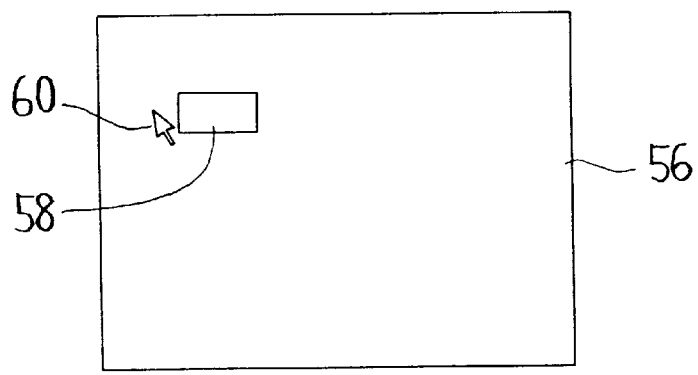
FIGS. 13 to 15 are views for explaining a method of positioning a pointer onto the button on the display by using the mouse according to the embodiment of the present invention, and show a state following the state of FIGS. 10 to 12.
Figure 14:
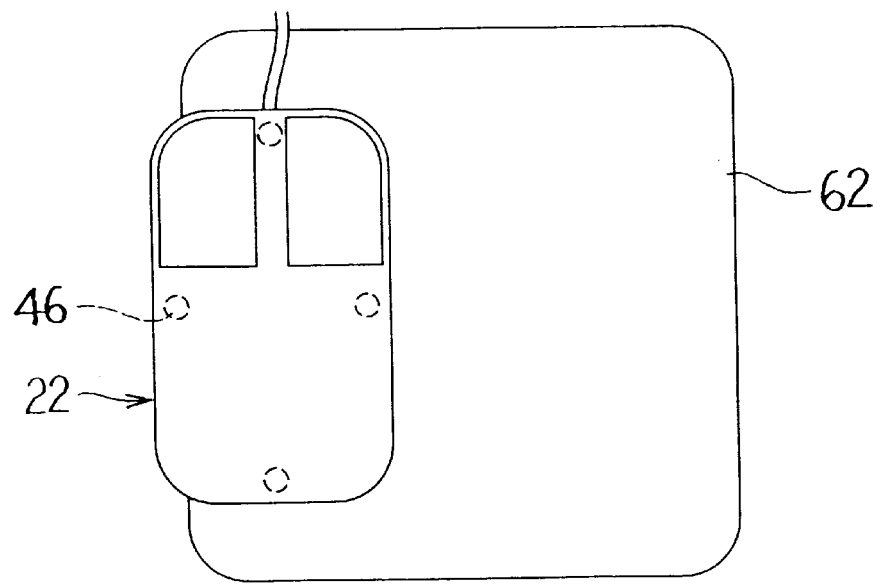
Figure 15:
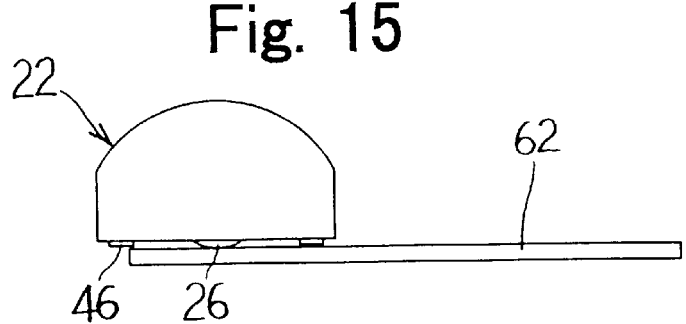

As shown in FIGS. 14 and 15, when the mouse 22 is maintained in this state, the pointer 60 moves to the left on the display 56, as described in step $S_2$ of the flow chart of FIG. 6. Assume that the pointer 60 passes the button 58 to reach the position shown in FIG. 13.

Figure 16:
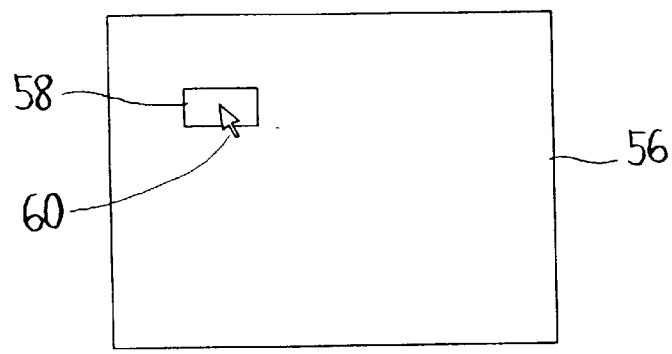
FIGS. 16 to 18 are views for explaining a method of positioning a pointer onto the button on the display by using the mouse according to the embodiment of the present invention, and show a state following the state of FIGS. 13 to 15.
Figure 17:
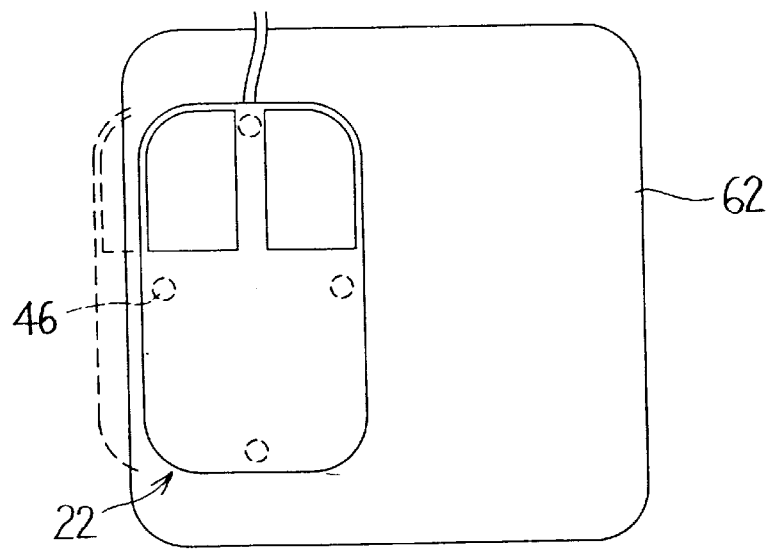
Figure 18:
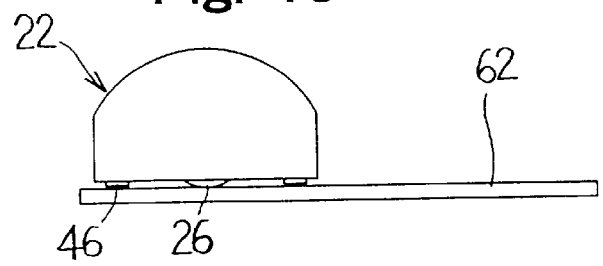

As shown in FIG. 17, the mouse 22 is returned to the portion inside the mouse pad 62. This state corresponds to steps $S_5$ and $S_{10}$ of the flow chart of FIG. 6 again, and the pointer 60 moves by a distance corresponding to the distance through which the mouse 22 has been moved. Therefore, the pointer 60 can be easily positioned on the button 58, as shown in FIG. 16.

In this description, the pointer 60 passes the button 58 once, as shown in FIG. 13. If the mouse 22 is moved to the right as soon as the pointer 60 reaches the button 58 so that the mouse pad 62 is present under the sensor 46, the pointer 60 can be positioned without passing the button 58.

As shown in FIG. 20, while the sensor 46 does not detect the presence of the mouse pad 62, the mouse 22 is moved forward, as indicated by an arrow 64. Then, the steps $S_2$ and $S_{10}$ of the flow chart of FIG. 6 are performed and the pointer 60 moves as indicated by an arrow 66 in FIG. 19. That is to say, the pointer moves upward by a distance (see an arrow 70) corresponding to the pulse count of the Y-axis encoder, while moving to the left at a predetermined speed (see an arrow 68). Therefore, in this case as well, the pointer 60 can be moved onto the button 58 without interposing the operation of lifting the mouse 22, moving it in the air and putting it down on the mouse pad 62.

When the mouse 22 is located on a position where the sensors 46 and 50 do not detect the presence of the mouse pad 62 and the sensors 48 and 52 detect the presence of the mouse pad 62 for example, the pointer 60 moves to the upper left on the display at a predetermined speed.

The area within which the mouse 22 moves in a state in which all of the sensors 46, 48, 50, and 52 detect the presence of the mouse pad 62 constitutes the first area. The area within which the mouse 22 moves in a state in which at least one of the sensors 46, 48, 50, and 52 does not detect the presence of the mouse pad 62 constitutes the second area. In the case of FIGS. 7 to 18, briefly speaking, the area of the mouse pad 62 coincides with the first area and the area outside the mouse pad 62 coincides with the second area.

The mouse according to the embodiment of the present invention has functions as follows. More specifically, when the mouse 22 of this embodiment is located in the first area, it functions in a mode (to be referred to as the "first mode" hereinafter) to move the pointer on the display by a distance corresponding to the moving amount of the mouse 22 detected by the X- and Y-axis encoders and the ball 26. When the mouse 22 is located in the second area, it functions in a mode (to be referred to as the "second mode" hereinafter) to move the pointer on the display at a predetermined speed.

In other words, in the mouse according to the embodiment of the present invention, when the first and second modes are selectively used, the necessity of performing an operation of lifting the mouse, moving it in the air and putting it down on the mouse pad is eliminated, and both the positioning performance and quick operation are satisfied. The first mode contributes to the positioning performance, while the second mode contributes to the quickness.

When the mouse 22 extends from the mouse pad 62 in a certain direction, the pointer 60 moves in this direction at a predetermined speed. This coincides with the human operation sense very much. Hence, the operation feeling of the mouse according to the embodiment of the present invention is very excellent. As described above with reference to FIGS. 19 and 20, the operation feeling when one of the right-to-left and back-and-forth movements is in the first mode while the other is in the second mode is also very excellent. Similarly, the operation feeling when both of the right-to-left and back-and-forth movements are in the second mode is also very excellent.

Modification 1

Figure 21:
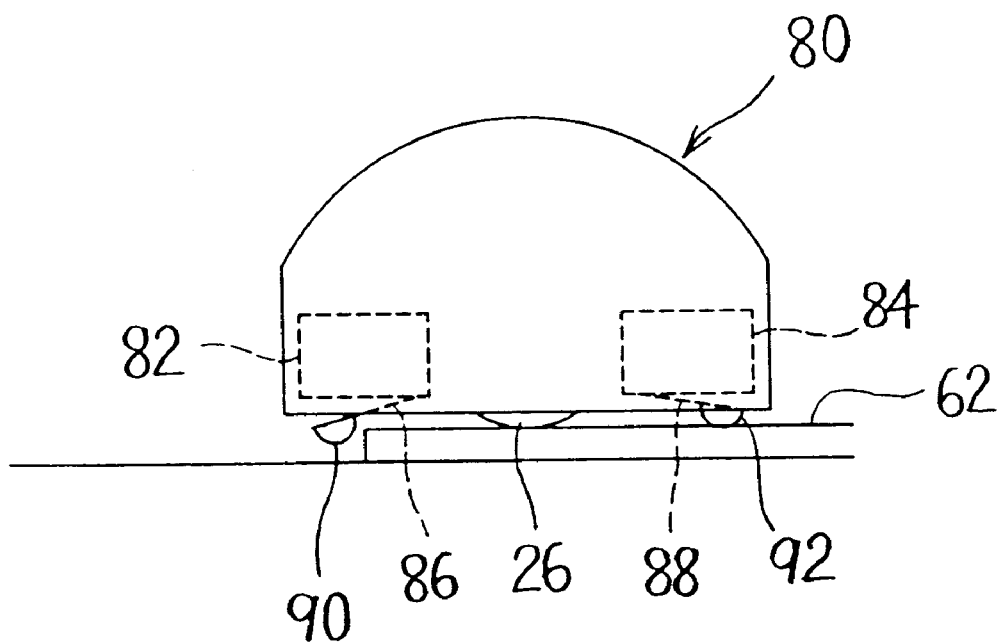
FIG. 21 is a view showing Modification 1 concerning an area sensor used in the mouse according to the embodiment of the present invention.

Modification 1 concerning an area sensor used in the mouse according to the embodiment of the present invention will be described. As shown in FIG. 21, the area sensor of a mouse 80 of Modification 1 has switches 82 and 84 having mechanical contacts. The switches 82 and 84 detect the edge of the mouse pad by detecting a height difference between the upper surface of the mouse pad and the upper surface of a desk or the like. Although FIG. 21 shows only two switches, four switches are arranged in fact, in the same manner as the sensors 46, 48, 50, and 52 shown in FIG. 4. When levers 86 and 88 abut against a switch 82, the switches 82 and 84 move to open/close their internal mechanical contacts to enable/disable the electrical signal, thereby detecting the presence of the mouse pad 62. Low-friction members 90 and 92 for decreasing friction with the mouse pad 62 are attached to the distal ends of the levers 86 and 88, respectively.

Modification 2

Figure 22:
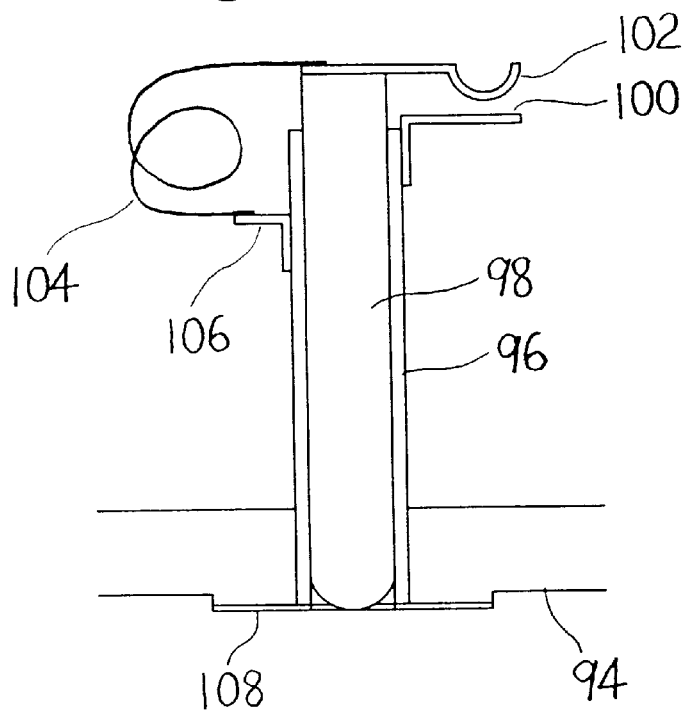
FIG. 22 is a sectional view showing a switch according to Modification 2 of the area sensor used in the mouse of the embodiment of the present invention.

Modification 2 concerning the area sensor used in the mouse according to the embodiment of the present invention will be described. FIG. 22 is a sectional view showing another example of a switch having a mechanical contact. A pipe 96 is attached perpendicular to a bottom surface 94 of the body of the mouse, and a rod 98 is slidably inserted in the pipe 96. Contacts 100 and 102 are respectively attached to the pipe 96 and rod 98 to oppose each other. The contact 102 is electrically connected to a metal fixture 106 with a flexible wire 104, and a contact opening/closing signal is obtained from the contact 100 and metal fixture 106. A projection is formed on the bottom surface 94 where the pipe 96 is attached. A low-friction member 108 is adhered to this projection to decrease the friction between the mouse and the mouse pad (not shown).

When the mouse pad is present under the rod 98, the rod 98 is lifted by the upper surface of the mouse pad so as to be located at the position shown in FIG. 22, and the contacts 100 and 102 are separate from each other. When the operator moves the mouse and the mouse pad is not present under the rod 98, the rod 98 is moved downward by the function of the gravity, and the contacts 100 and 102 come into contact with each other. When the operator moves the mouse in the opposite direction, since the lower end of the rod 98 is rounded, the lower end of the rod 98 rides over the corner of the mouse pad, the rod 98 moves upward, and the contacts 100 and 102 separate from each other.

Modification 3

Figure 23:
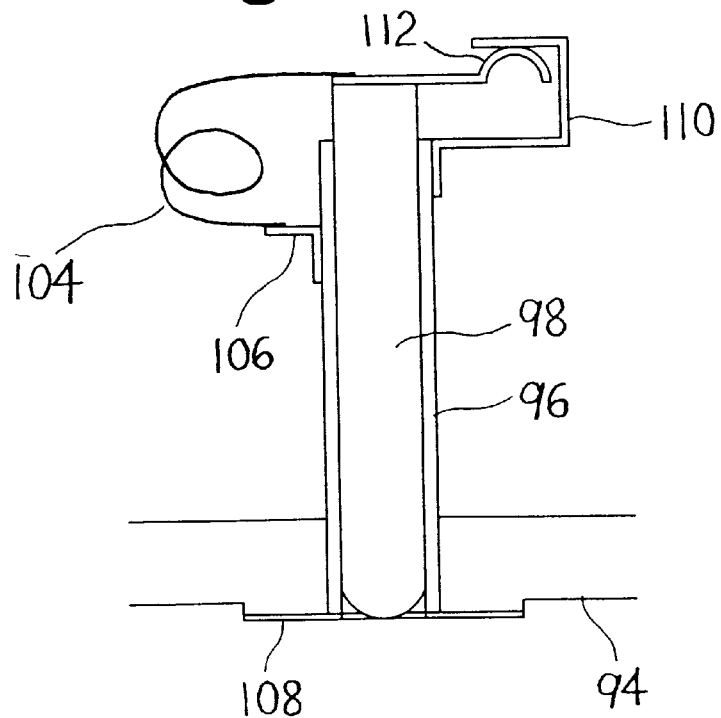
FIG. 23 is a sectional view showing a switch according to Modification 3 of the area sensor used in the mouse of the embodiment of the present invention.

Modification 3 concerning the area sensor used in the mouse according to the embodiment of the present invention will be described. FIG. 23 is a sectional view showing still another example of a switch having a mechanical contact. A contact 110 attached to a pipe 96 extends to overhang above a contact 112 attached to a rod 98. When the rod 98 moves upward, the contacts 110 and 112 come into contact with each other. Therefore, when the mouse pad is present under the rod 98 and the rod 98 is lifted by the upper surface of the mouse pad, the contacts 110 and 112 come into contact with each other. Accordingly, when compared to the case of FIG. 22, the contacts come into contact with each other more reliably.

Modification 4

Figure 24:
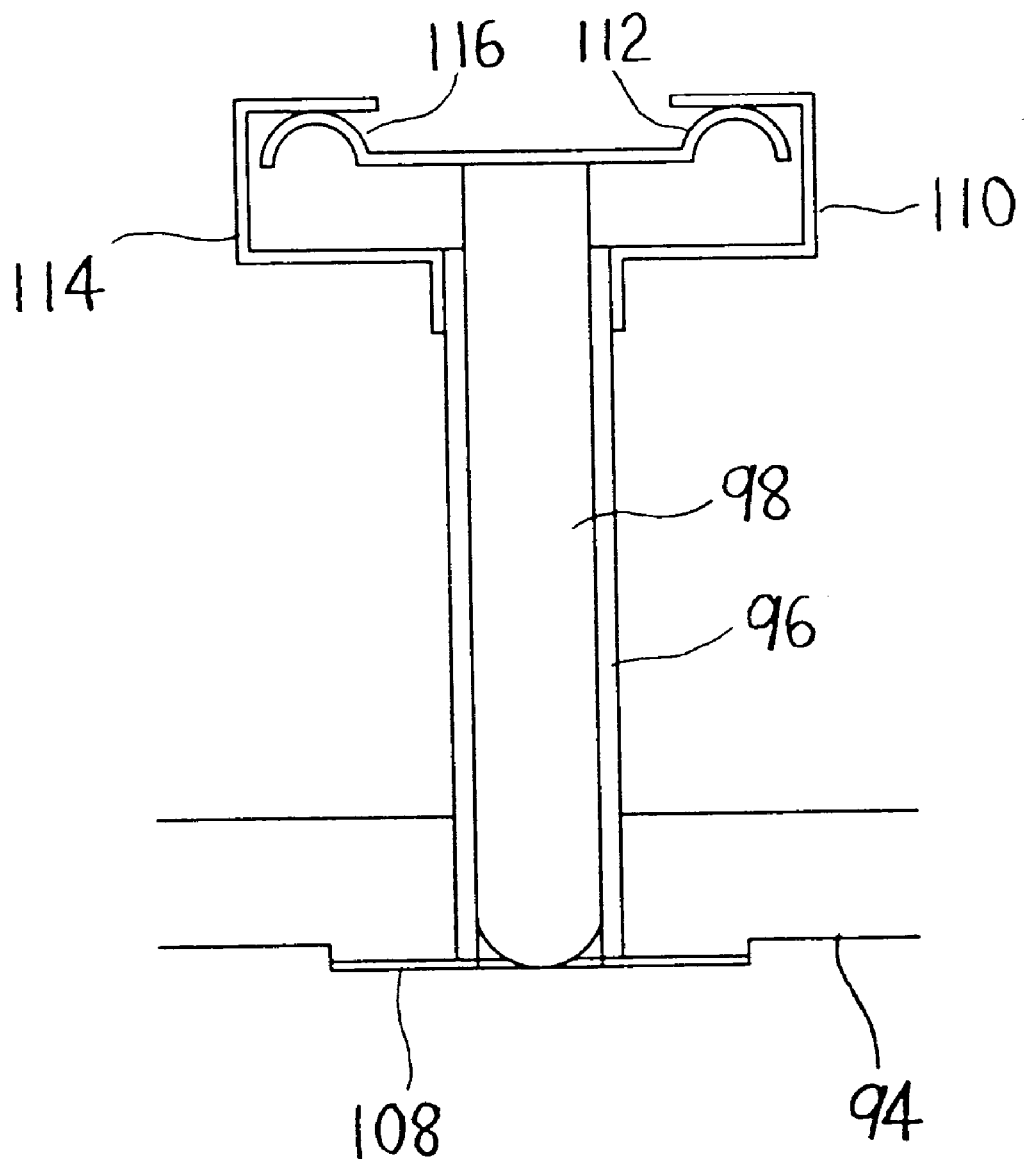
FIG. 24 is a sectional view showing a switch according to Modification 4 of the area sensor used in the mouse of the embodiment of the present invention.

Modification 4 concerning the area sensor used in the mouse according to the embodiment of the present invention will be described. FIG. 24 is a sectional view showing still another example of a switch having a mechanical contact. A contact 114 as well as a contact 110 is attached to a pipe 96, and a contact 116 as well as a contact 112 is attached to a rod 98. The contacts 112 and 116 are electrically connected to each other.

When the mouse pad is present under the rod 98 and the rod 98 is lifted by the upper surface of the mouse pad, the contacts 110 and 112 come into contact with each other, and the contacts 114 and 116 come into contact with each other, so that the contacts 110 and 114 are electrically connected to each other. According to the switch of Modification 4, the wire 104 required in FIGS. 22 and 23 can be omitted, and the rod 98 can slide in the pipe 96 more freely.

Modification 5

Modification 5 concerning the area sensor used in the mouse according to the embodiment of the present invention will be described with reference to FIG. 4. In Modification 5, sensors 46, 48, 50, and 52 identical to those shown in FIG. 4 are optical sensors. The sensors 46, 48, 50, and 52 optically detect the height difference between the upper surface of the mouse pad and the upper surface of the desk or the like, thereby detecting the edge of the mouse pad. Alternatively, the sensors 46, 48, 50, and 52 may detect the difference in reflectance, color, material, or the like between the mouse pad and the desk or the like.

Modification 6

Figure 25:
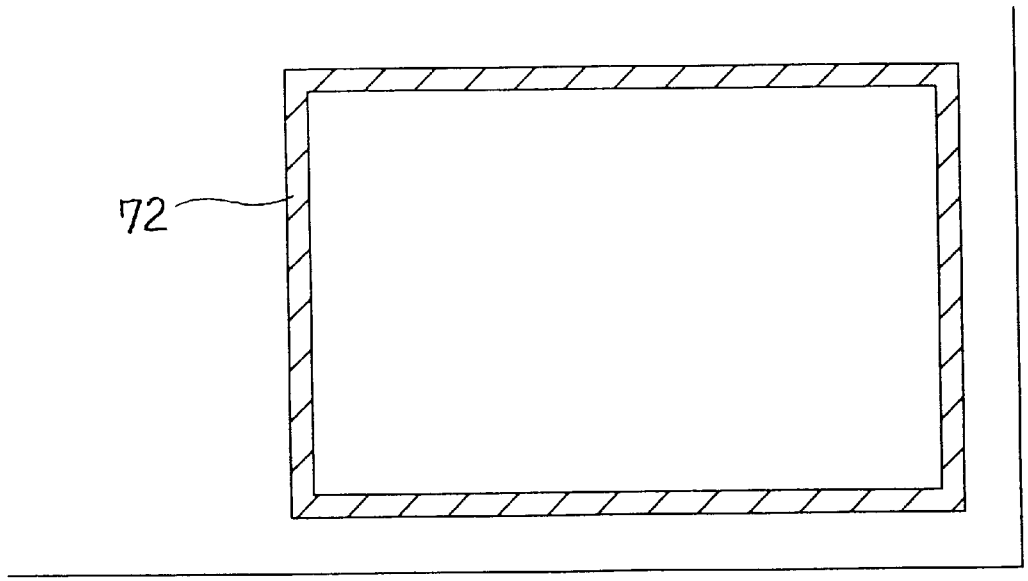

Modification 6 concerning the area sensor used in the mouse according to the embodiment of the present invention will be described. In Modification 5, when the presence of a mouse pad 62 is detected by the sensors 46, 48, 50, and 52, it is detected whether a mouse 22 is located in the first or second area. In Modification 6, as shown in FIG. 25, when an area 72 defined on a desk, table or the like or on the edge of the mouse pad is detected, it is detected whether the mouse is located in the first or second area. The area 72 has optical properties, e.g., reflectance or color, which are different from those of other areas. The mouse of Modification 6 has four optical sensors in its bottom surface, in the same manner as in Modification 5. When these optical sensors detect the area 72, it is detected whether the mouse is located in the first or second area.

Modification 7

Modification 7 concerning the area sensor used in the mouse according to the embodiment of the present invention will be described. In Modifications 5 and 6, the optical sensors arranged on the bottom surface of the mouse detect whether the mouse is located in the first or second area independently of other optical sensors. The optical sensor of Modification 7 detects whether the mouse is located in the first or second area from a difference between its output signal and those of other optical sensors.

Figure 26:
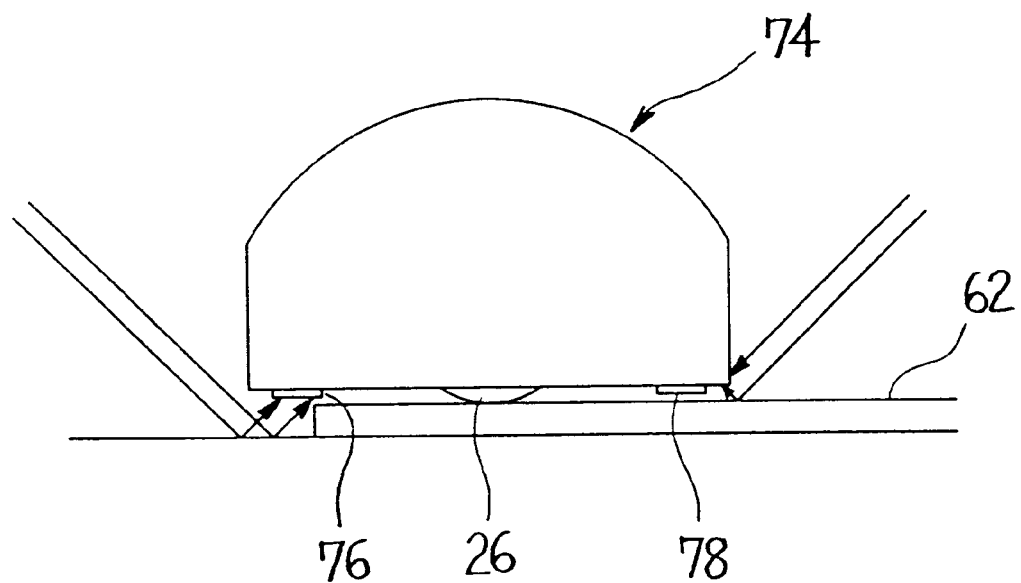
FIG. 26 is a view showing Modification 7 concerning the area sensor used in the mouse of the embodiment of the present invention.

For example, as shown in FIG. 26, when a mouse 74 is partly outside a mouse pad 62, a larger amount of light is incident on an optical sensor 76 than on an optical sensor 78, and the output signal of the optical sensor 76 becomes larger than the output signal of the optical sensor 78. This is because a space that allows reflection of light, e.g., illumination of the room, is present under the optical sensor 76. Accordingly, when the magnitude or the like of the output signal of this optical sensor is compared with that of the output signals of the other optical sensors, the respective optical sensors can detect the presence of the mouse pad 62 without being influenced by the brightness of the place where the mouse 74 is used.

Modification 8

Figure 27:
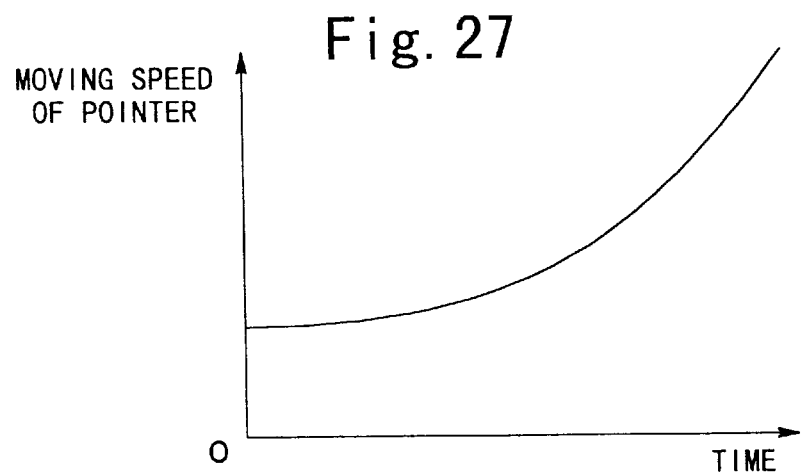
FIGS. 27 to 29 are views showing Modification 8 concerning the moving speed of the pointer on the display operated with the mouse according to the embodiment of the present invention, and show various types of patterns of the moving speed of the pointer.
Figure 28:
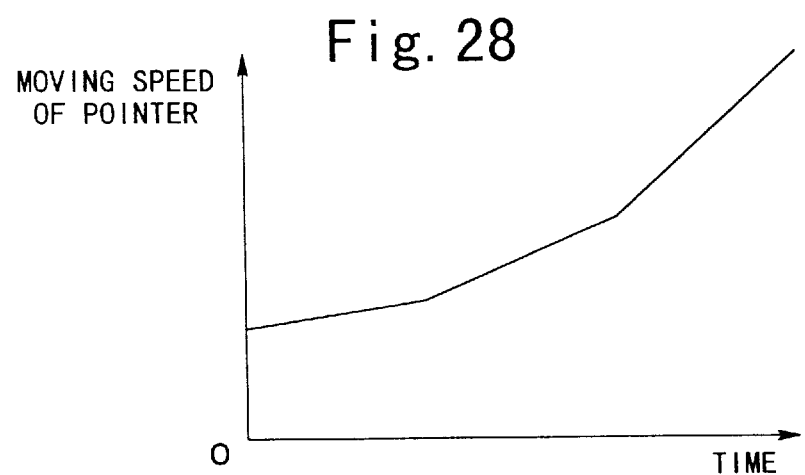
Figure 29:
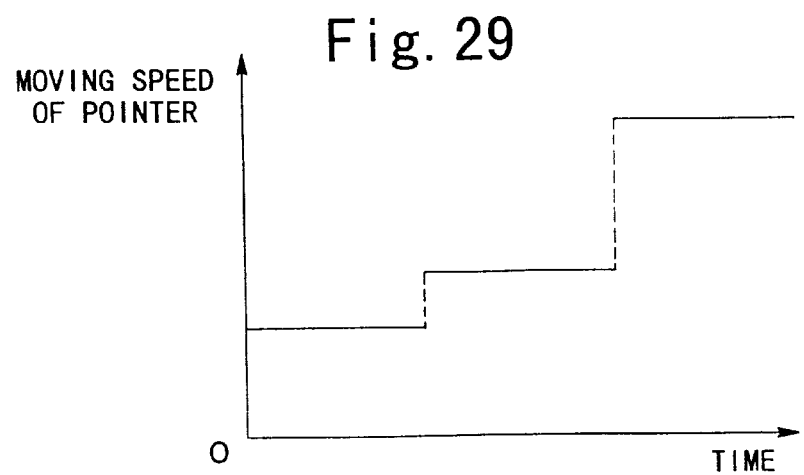

Modification 8 concerning the moving speed of the pointer on the display operated with the mouse according to the embodiment of the present invention will be described. FIGS. 27 to 29 are graphs each showing the moving speed of the pointer on the display when the area sensor detects that the mouse is located in the second area. FIG. 27 shows a case wherein the moving speed increases smoothly, FIG. 28 shows a case wherein the moving speed increases polygonally, and FIG. 29 shows a case wherein the moving speed increases stepwise.

The pointer may move on the display at a constant speed when the area sensor detects that the mouse is located in the second area.

The mouse according to the above embodiment and modifications can be similarly used by a workstation, a large-scale computer, a portable device such as an electronic notebook, a word-processing machine, an internet terminal, or the like as well as by a personal computer. Note that these devices are included in computers.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mouse used for operating a pointer displayed on a display of a computer to give a control signal to said computer, comprising:

a moving amount sensor for detecting moving amounts of said mouse in a first area of a mouse pad, a desk, or the like, and a second area outside said first area;

a button arranged on a surface of said mouse;

an area sensor for detecting whether said mouse is located in said first or second area; and a signal generator for, when said area sensor detects that said mouse is located in said first area, generating a signal that moves said pointer on said display by a distance corresponding to a moving amount detected by said moving amount sensor and, when said area sensor detects that said mouse is located in said second area, generating a signal that moves said pointer on said display at a predetermined speed, said generated signal being transmitted to said computer.

2. A mouse according to claim 1, wherein when said mouse moves out of said first area to reach said second area, said area sensor detects whether said mouse moves in a forward, backward, right or left direction, and said signal generator generates a signal that moves said pointer upward on said display when said mouse moves out to reach said second area forward, moves said pointer downward on said display when said mouse moves out to said second area backward, moves said pointer to the right on said display when said mouse moves out to the right to reach said second area, and moves said pointer to the left on said display when said mouse moves out to the left to reach said second area.

3. A mouse according to claim 2, wherein said area sensor comprises a sensor for detecting that said mouse moves out forward, a sensor for detecting that said mouse moves out backward, a sensor for detecting that said mouse moves out to the right, and a sensor for detecting that said mouse moves out to the left.

4. A mouse according to claim 1 wherein, when said button is depressed or released, said signal generator generates a signal indicating depression or release, and said generated signal is transmitted to said computer.

5. A mouse according to claim 1, wherein said area sensor detects whether said mouse is located in said first or second area by detecting an edge of a mouse pad on which said mouse is operated.

6. A mouse according to claim 5, wherein said area sensor comprises a switch having a mechanical contact.

7. A mouse according to claim 6, wherein said switch comprises a pipe attached to a body of said mouse, a rod which slides in said pipe when one end thereof comes into contact with or separates from said mouse pad, a first contact attached to said pipe, and a second contact attached to said rod to come into contact with and separate from said first contact.

8. A mouse according to claim 7, wherein said first and second contacts separate from each other when said rod is located on said mouse pad.

9. A mouse according to claim 7, wherein said first and second contacts come into contact with each other when said rod is located on said mouse pad.

10. A mouse according to claim 7, wherein said switch further comprises a third contact attached to said pipe and a fourth contact attached to said rod to come into contact with and separate from said third contact, and said second and fourth contacts are electrically connected to each other.

11. A mouse according to claim 1, wherein said area sensor comprises an optical sensor.

12. A mouse according to claim 11, wherein said area sensor comprises a plurality of optical sensors, and it is detected whether said mouse is located in said first or second area by detecting that an output signal from one of said optical sensors is different from an output signal from remaining one of said optical sensors.

13. A mouse according to claim 1, wherein said signal generator generates a signal for moving said pointer gradually faster when said area sensor detects that said mouse is located in said second area.

14. A computer system comprising a display and a mouse used for operating a pointer displayed on said display, wherein said mouse comprises:

a moving amount sensor for detecting moving amounts of said mouse in a first area of a mouse pad, a desk, or the like, and a second area outside said first area;

a button arranged on a surface of said mouse;

an area sensor for detecting whether said mouse is located in said first or second area; and a signal generator for, when said area sensor detects that said mouse is located in said first area, generating a signal that moves said pointer on said display by a distance corresponding to a moving amount detected by said moving amount sensor and, when said area sensor detects that said mouse is located in said second area, generating a signal that moves said pointer on said display at a predetermined speed, said generated signal being transmitted to said computer.

* * * * *